United States Patent
Higgins et al.

(10) Patent No.: US 9,569,397 B2
(45) Date of Patent: Feb. 14, 2017

(54) METHODS AND SYSTEMS FOR MAINTENANCE OF TURBOMACHINERY

(75) Inventors: Christopher Dean Higgins, Greenville, SC (US); Thomas Bradley Beddard, Marietta, GA (US); David Stephen Muench, Simpsonville, SC (US); Michael Edward Bernard, Simpsonville, SC (US); Patrick Clinton Bowling, Roswell, GA (US)

(73) Assignee: General Electric Company, Schenectady, NY (US)

( * ) Notice: Subject to any disclaimer, the term of this patent is extended or adjusted under 35 U.S.C. 154(b) by 811 days.

(21) Appl. No.: 13/548,066

(22) Filed: Jul. 12, 2012

(65) Prior Publication Data

US 2014/0019091 A1   Jan. 16, 2014

(51) Int. Cl.
*G06F 15/00* (2006.01)
*G06Q 10/00* (2012.01)

(52) U.S. Cl.
CPC ............ *G06F 15/00* (2013.01); *G06Q 10/20* (2013.01)

(58) Field of Classification Search
CPC ............................... G06F 15/00; G06Q 10/06
USPC ........................................ 705/305; 702/184
See application file for complete search history.

(56) References Cited

U.S. PATENT DOCUMENTS

| | | | | | |
|---|---|---|---|---|---|
| 2002/0143421 | A1* | 10/2002 | Wetzer | ................... | G06Q 10/06 700/100 |
| 2005/0073673 | A1* | 4/2005 | Devitt | ................... | F01D 21/003 356/37 |
| 2008/0082345 | A1* | 4/2008 | Greiner | ................... | G06Q 10/06 705/305 |
| 2008/0172268 | A1* | 7/2008 | Wingenter | ........................ | 705/7 |
| 2009/0037206 | A1* | 2/2009 | Byrne et al. | ...................... | 705/1 |

OTHER PUBLICATIONS

R. Hoeft, et al., "Heavy-Duty Gas Turbine Operating and Maintenance Considerations", GE Power Systems, GER-3620-J.*
R. C. M. Yam, "Intelligent Predictive Decision Support System for Condition-Based Maintenance", Int J Adv Manuf Technol 17 (2001).*
Robert Hoeft, Jamison Janawitz, and Richard Keck; GE Power Systems, Heavy-Duty Gas Turbine Operating and Maintenance Considerations; Jan. 2003; Atlanta GA.
Dr. R. C. M. Yam, et al; Intelligent Predictive Decision Support System for Condition-Based Maintenance; Int J Adv Manuf Technol (2001) vol. 17, pp. 384-391 @2001 Springer-Verlag London Limited.

* cited by examiner

*Primary Examiner* — Mohamed Charioui
*Assistant Examiner* — Catherine Rastovski
(74) *Attorney, Agent, or Firm* — Fletcher Yoder, P.C.

(57) ABSTRACT

In one embodiment, a system includes a condition based replacement life (CBRL) approval system configured to receive a turbomachinery component data and to approve a turbomachinery component for CBRL based on the turbomachinery component data. The system further includes a CBRL validation system configured to repair the turbomachinery component into a repaired turbomachinery component, wherein the repaired turbomachinery component is configured to operate in a turbomachinery beyond a service time of the turbomachinery component.

17 Claims, 7 Drawing Sheets

METHODS AND SYSTEMS FOR MAINTENANCE OF TURBOMACHINERY

BACKGROUND OF THE INVENTION

The invention relates generally to turbomachinery, and more particularly to methods and systems for the maintenance of turbomachinery.

Turbomachinery may include an apparatus such as a turbine, a compressor, or a pump. As the turbomachinery operates, efficiency and performance may change over time. This change in performance may be due to various factors such as wear or component damage. Maintenance, including replacement of certain turbomachinery components, may be applied to the turbomachinery to restore efficiency and operational performance. However, the maintenance may be applied inefficiently, and may be costly.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a condition based replacement life (CBRL) approval system configured to receive a turbomachinery component data and to approve a turbomachinery component for CBRL use based on the turbomachinery component data. The system further includes a CBRL validation system configured to validate the turbomachinery component into a validated turbomachinery component, wherein the validated turbomachinery component is configured to operate in a turbomachinery beyond a service time of the turbomachinery component.

In a second embodiment, a method includes approving a turbomachinery component for use in a condition based replacement life (CBRL) activity, wherein the approving the turbomachinery component includes determining if a first deterioration of the turbomachinery component is observable in a field environment, determining if a second deterioration of the turbomachinery component is observable in a service and repair shop, approving the turbomachinery component based at least in part on the determining if the first and the second deteriorations are observable. The method also includes validating the turbomachinery component after the approving the turbomachinery component for use in the CBRL activity. The validating the turbomachinery component includes inspecting the turbomachinery component, repairing the turbomachinery component, or a combination thereof. The validating the turbomachinery component further includes tracking a usage of the turbomachinery component in a turbomachinery after the inspecting, the repairing, of the combination thereof. The validating the turbomachinery component additionally includes evaluating a performance of the turbomachinery component in the turbomachinery, wherein the CBRL activity comprises using the turbomachinery component in the turbomachinery beyond a service time of the turbomachinery component.

In a third embodiment, a system includes an approval system configured to approve a turbomachinery component for use in a turbomachinery beyond a service time of the turbomachinery component, and to determine if a first deterioration of the turbomachinery component is observable. The system further includes a validation system configured to inspect the turbomachinery component, to repair the turbomachinery component, or a combination thereof, and to use the turbomachinery component in a turbomachinery after the inspection, the repair, or the combination thereof, of the turbomachinery component.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
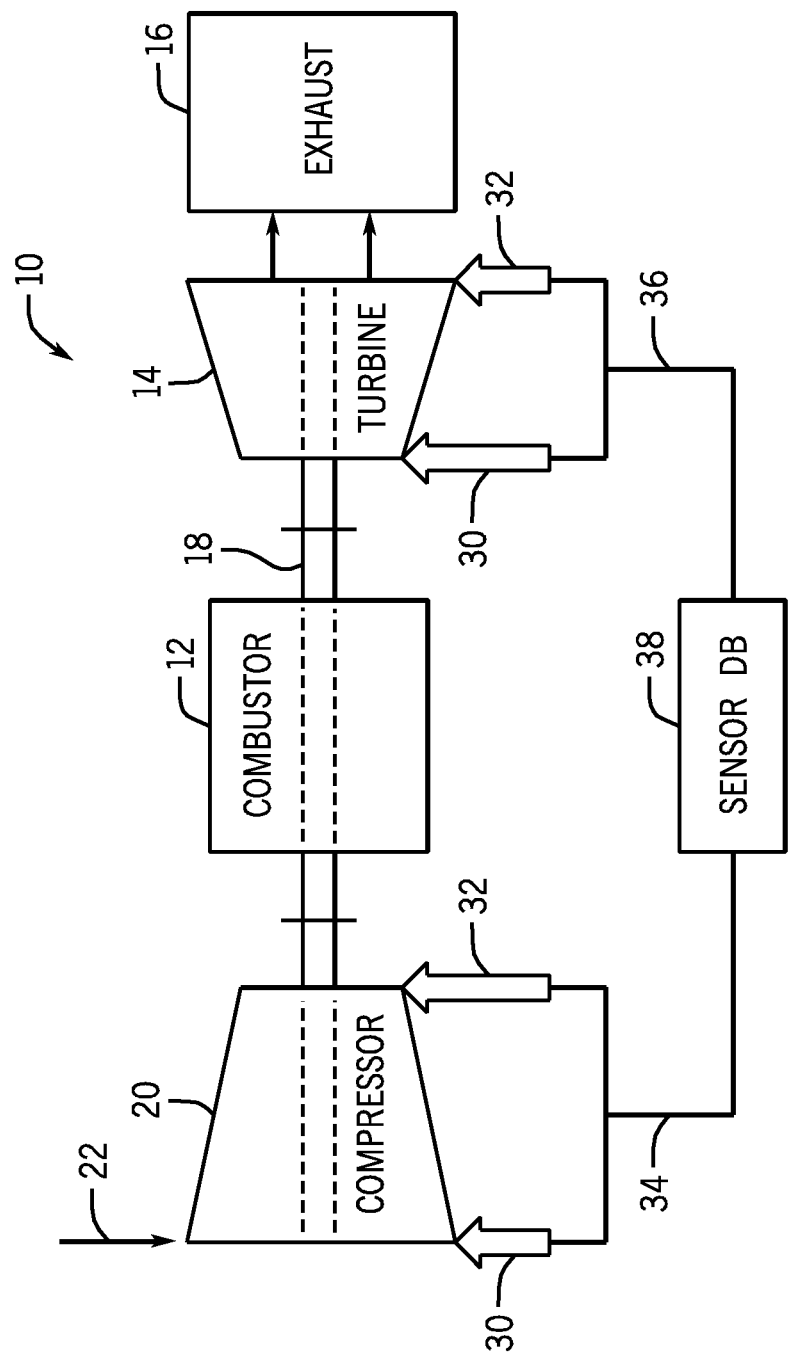
FIG. 1 is a block diagram of an embodiment of a turbomachinery, e.g., turbine system.

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Turbomachinery, such as a gas turbine, a steam turbine, a wind turbine, a hydroturbine, a compressor, or a pump, may undergo changes or shifts in performance during operation. For example, the turbine engine may shift from operating at certain revolutions per minute (RPM) to operating at a lower or higher RPM without any changes made by an operator or controller for the turbine engine. The operational changes (e.g., changes in RPM, temperature, pressure, vibration) of the turbomachinery may be attributed to certain conditions, such as worn components and/or unexpected maintenance events (e.g., blade cracks, shroud cracks, rubbing of moving and stationary parts, leakage). Accordingly, maintenance operations may be scheduled to occur at specific milestones of machine operation, i.e. 8000 operation hours, 24000 hours, 450 machine starts, and these operational parameters may be modified (factored) to account for other modes of atypical operation known to accelerate the degradation of internal machine components. Maintenance events scheduled accordingly will be selected for inspection, repair, and/or replacement, as determined by total operational exposure and the physical condition of subject machine components. Additionally or alternatively, maintenance operations may be scheduled to occur at specific calendar time periods (e.g., 1 month, 6 months, 2 years), such as the replacement of certain of the turbomachinery components.

In one embodiment, a contractual agreement between a service provider and a turbomachinery operator (e.g., turbomachinery owner or lessee) may specify the maintenance schedule (e.g., service time) and type of maintenance to be performed. For example, a hot gas path inspection (HGPI) interval, a combustion inspection (CI) interval, and/or a major inspection (MI) interval may be contractually specified to occur approximately every 8,000-24,000 fired hours, 15,000-30,000 fired hours, 8,000-100,000 fired hours, at a manufacturer specified number of fired hours, or at any other desired time period. In another embodiment, no contractual agreement may be used. In this embodiment, the maintenance may also occur cyclically or when otherwise specified by the turbomachinery operator or owner. During turbomachinery operations, it may be beneficial to include components that operate within desired limits, such as manufacturer-specified limits (e.g., fired hours, N-ratios [e.g., ratio of fired hours to fired starts], temperatures, pressures, flow rates). Accordingly, certain components (e.g., caps, liners, fuel nozzles, blades, power nozzles, transition pieces, shrouds) may be replaced at specified time schedules with new components. However, the components may still be in a useable condition, e.g., within serviceable limits, service limits, operational limits, and/or repairable limits.

As described herein, a serviceable limit is a life cycle condition of a part at or below which the part can be returned from a repair shop to a customer site without any additional repairs. This is a criteria typically applied by the repair shop or service center, for example, after inspecting the part. A service limit is a life cycle condition of the part at or below which the part can be used up to the next scheduled inspection (e.g., second tour of the part) without repair. The service limit is usually applied by an inspection site (e.g., inspection team at customer site). An operational limit is a life cycle condition of the part where the part may have consumed a significant portion of its useful life, and thus, may benefit from recondition and/or repair before return to operational use. A repairable limit is a life cycle condition where the part is found at or above a maximum amount of "wear and tear." That is, the part may be at its end of life, and further repair may not be economically or physically feasible.

Advantageously, the systems and methods described herein, may enable the inspection and/or repair of a variety of turbomachinery parts that may have been otherwise replaced, thus minimizing or eliminating the need to discard the parts. Indeed, the parts may have reached operational limits, and through repairs, may be reused through a second tour or through a next scheduled inspection rather than being replaced. In one embodiment, a condition based replacement life (CBRL) approval process may be used, suitable for approving a component as a CBRL-approved component. The CBRL approval process may analyze the component, including the use of engineering analysis (e.g., failure mode and effect analysis [FMEA]), statistical analysis (e.g., fleet parts failure data mining), economic analysis (e.g., return on repair investment [RORI]), and the like, to determine if the part is approved for CBRL use.

Once the part is approved for CBRL use, a repair shop may follow CBRL guidelines, as described in more detail below, and repair the CBRL-approved part rather than replace the part. The repaired part may then be reused during the second tour or subsequent tours, up to the part's repairable limit. Additionally, a CBRL validation process is provided, suitable for verifying and validating that the part performed as desired during the second (or subsequent) usage tours. Further, systems are described herein, enabling the CBRL approval and validation processes. By minimizing or eliminating the replacement of certain parts, substantial efficiencies and costs savings may be delivered.

With the foregoing in mind, it may be useful to describe an embodiment of a turbomachinery incorporating the techniques disclosed herein, such as a gas turbine system 10 illustrated in FIG. 1. As depicted, the turbine system 10 may include a combustor 12. The combustor 12 may receive fuel that has been mixed with air, for combustion in a chamber within combustor 12. This combustion creates hot pressurized exhaust gases. The combustor 12 directs the exhaust gases through a turbine 14 toward an exhaust outlet 16. The turbine 14 may be part of a rotor. As the exhaust gases pass through the turbine 14, the gases force turbine blades to rotate a drive shaft 18 along an axis of the turbine system 10. As illustrated, the drive shaft 18 is connected to various components of the turbine system 10, including a compressor 20.

The drive shaft 18 may include one or more shafts that may be, for example, concentrically aligned. The drive shaft 18 may include a shaft connecting the turbine 14 to the compressor 20 to form a rotor. The compressor 20 may include blades coupled to the drive shaft 18. Thus, rotation of turbine blades in the turbine 14 causes the shaft connecting the turbine 14 to the compressor 20 to rotate blades within the compressor 20. This compresses air in the compressor 20. The rotation of blades in the compressor 20 compresses incoming air 22. The compressed air is fed to the combustor 12 and mixed with fuel to allow for higher efficiency combustion. The shaft 18 may also be connected to a load, which may be a vehicle or a stationary load, such as an electrical generator in a power plant or a propeller on an aircraft.

The turbine system 10 may also include a plurality of sensors, configured to monitor a plurality of engine parameters related to the operation and performance of the turbine system 10. The sensors may include, for example, inlet sensors 30 and outlet sensors 32 positioned adjacent to, for example, the inlet and outlet portions of the turbine 14, and the compressor 20, respectively. The inlet sensors 30 and outlet sensors 32 may measure, for example, environmental conditions, such as ambient temperature and ambient pressure, as well as a plurality of engine parameters related to the operation and performance of the turbine system 10, such as, exhaust gas temperature, rotor speed, engine temperature, engine pressure, gas temperature, engine fuel flow, exhaust flow, vibration, noise, clearance between rotating and stationary components, compressor discharge pressure, combustion dynamics, pollution (e.g., nitrogen oxide [NOx] emissions, sulfur oxide [SOx] emissions, carbon oxides [COx], and particulate count), and turbine exhaust pressure. Further, the sensors 30 and 32 may also measure actuator information such as valve position, and a geometry position of variable geometry components (e.g., air inlet).

The plurality of sensors 30 and 32 may also be configured to monitor engine parameters related to various operational phases (e.g., start-up, shut-down, or steady state of operation) of the turbine system 10. Measurements taken by the plurality of sensors 30 and 32 may be transmitted via module lines 34 and 36, which may be communicatively coupled to a sensor database (DB) 38. For example, module line 34 may be utilized to transmit measurements from the compressor 20, while module line 36 may be utilized to transmit measurements from the turbine 14. It is to be understood that other sensors may be used, including combustor 12 sensors, exhaust 16 sensors, intake sensors, and load sensors. It is also to be understood that the gas turbine system 10 is only an example embodiment of turbomachinery, and that other gas turbine systems may include, for example, multiple turbines, multiple shafts, and other arrangement of system 10 components. Alternatively, the turbomachinery may not be a gas turbine system 10 but may be a steam turbine, a hydroturbine, or a wind turbine.

As mentioned above, the gas turbine system 10 may experience performance changes attributed to worn components and/or unexpected events (e.g., blade cracks, compressor 12 misfiring, turbine 14 fouling, unbalanced shaft 18 or, fluid leakage). Accordingly, a scheduled maintenance interval may be provided, suitable for maintaining the operational performance and extending the life of the turbine system 10 and related components. Without the techniques disclosed herein, certain parts may have been replaced without regard to life cycle considerations. For example, a replaced part may have been at or below the operational limit. This may have resulted in the replacement of parts still including a useful life. Advantageously, a process, such as the process described in more detail below with respect to FIG. 2, enables the turbine system 10 to exceed certain parts usage or service limits, while maintaining operational reliability and performance.

Figure 2:
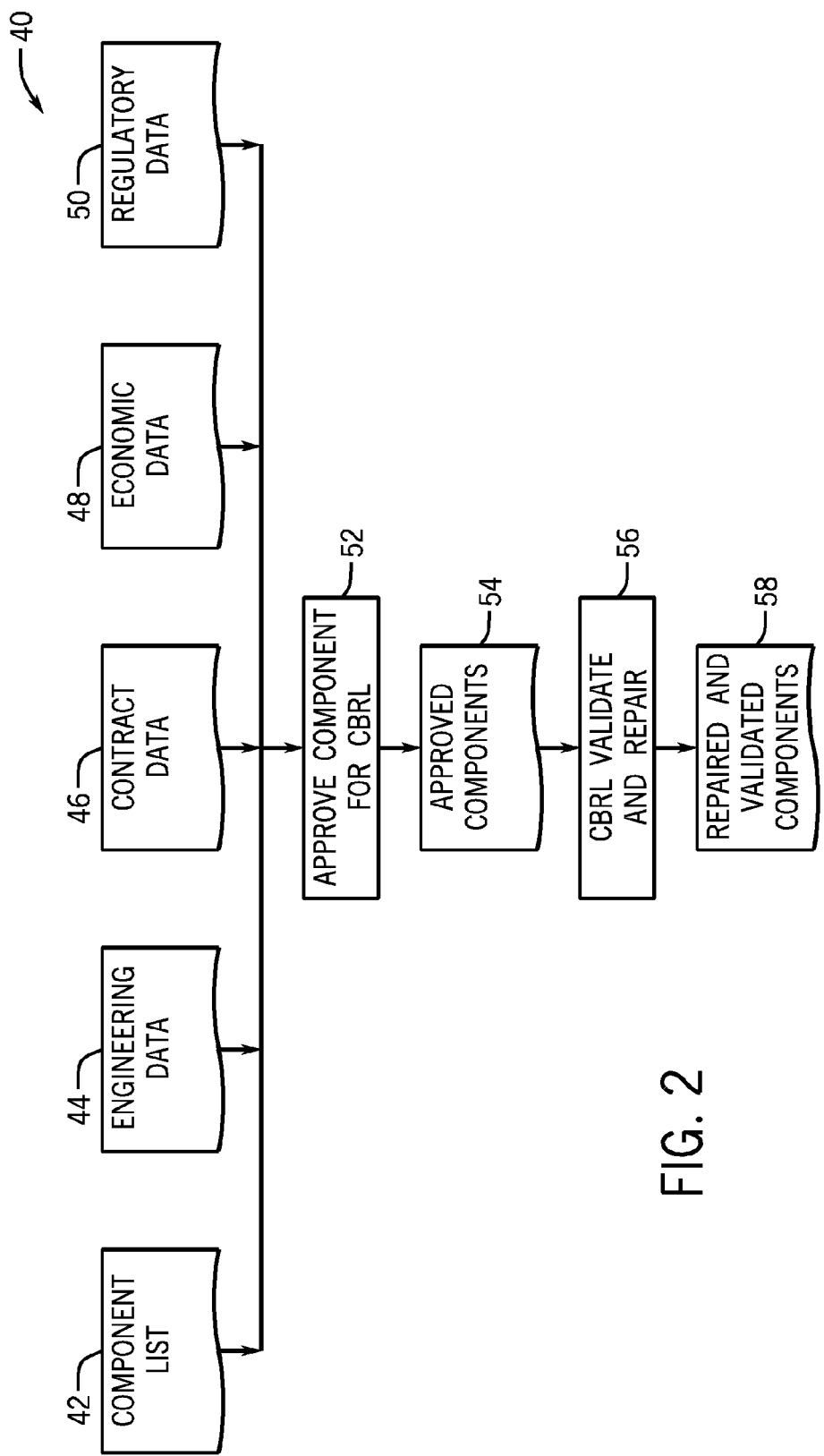
FIG. 2 is a flow chart of an embodiment of a process useful in extending operations for the turbomachinery of FIG. 1.

FIG. 2 is flow chart of an embodiment of a CBRL process 40 suitable for CBRL approving, repairing, and validating certain components for reuse rather than replacement. Indeed, the process 40 may provide for a more efficient utilization of the turbomachinery 10 by enabling the continued use of turbomachinery 10 components that may have otherwise been replaced. Additionally, the process 40 may enable the continued operation of the turbomachinery 10 in a reliable manner, even though the use of the components may exceed manufacturer recommendations for fired hours, number of starts, and other operational measures, including operating temperatures, pressures, flow rates, and/or clearances (e.g., distance between a rotating component and a fixed component). The process 40 may be implemented as executable code instructions stored on a non-transitory tangible computer-readable medium, such as the volatile or non-volatile memory of a computer or a computer system.

In the depicted embodiment, a component list 42 is provided, which may list all subsystems and components of the turbomachinery 10. Engineering data 44, including part details (e.g. part schematics, photographs, free-body diagrams, material used), physics-based models (e.g., stress/strain models, temperature analysis models, computer aided design [CAD] models, finite element analysis [FEA] models, failure modes and effects analysis [FMEA], low cycle fatigue [LCF] life prediction models, computational fluid dynamics [CFD] models, parametric solid models, non-parametric solid modeling, 3-dimension to 2-dimension FEA mapping models), statistics-based models (e.g., Montecarlo simulations, data mining models, linear regression models, non-linear regression models), tolerance data, and the like, may be provided for each of the components listed in the component list 42.

A contract data 46 may also be used. The contract data may include details useful for contractual service (CS) teams providing operational support for the turbomachinery 10. For example, a CS agreement may include performance measures to be enabled by the turbomachinery (e.g., power produced, fired hours of usage, number of starts, N-ratios), planned maintenance schedules, unplanned maintenance coverage (e.g., return to service times after unplanned maintenance), costs, and/or personnel types and numbers to be provided at turbomachinery 10 site. The CS agreement may also detail manufacturer recommended fuel/air quality, firing temperature expectations, and other operational usage details.

Economic data 48 may include, for each component of the list 42, economic information such as component cost, shipping cost, installation cost, availability, inventory levels, maintenance data cost (e.g., costs of maintenance manuals, cost for data logging services, cost for data logging analysis), and so forth. Additionally, regulatory data 50 may be used. The regulatory data 50 may include data related to local, state, federal, and international regulations affecting the turbomachinery 10. For example, emission limits, particulate counts, "green" credits, hazardous material (HAZMAT) regulations, occupational safety and health administration (OSHA) regulations, and so on.

The data 42, 44, 46, 48, and 50 may then be used as inputs to approve certain components 42 for CBRL (block 52). The approval of components for CBRL (block 52) is described in further detail in FIGS. 3 and 4 below. After approval (block 52) the components 54 approved for CBRL may be used. The process 40 may then CBRL validate and repair (block 56) the approved components 54. For example, as described in more detail below with respect to FIGS. 5 and 6, the approved components 54 may be assigned certain tracking tags and a repair shop may inspect the approved components 54. Should the inspected components 54 pass inspection, the components 54 may be put back into service, rather than being scrapped and replaced with new hardware. In other cases, a component will be scrapped, with frequency of scrap events being tracked for purposes of financial reporting. In some cases, the inspected components 54 may be functionally suitable for continued use without further work by the repair shop. In other cases, the inspected components may be worked on (e.g., refurbished or repaired) before further use. In yet other cases, a component may be part of a "scrap" or fallout profile, such that the component is not reused. Accordingly, repaired and validated components 58 may be derived. By approving (block 52), repairing and validating (block 56) the components 58, significant efficiencies and cost savings may be realized. Indeed, rather than replacing components 54 that may still have useful operating lives, the techniques disclosed herein may enable the further use of the components 54 up to their repairable limits.

Figure 3:
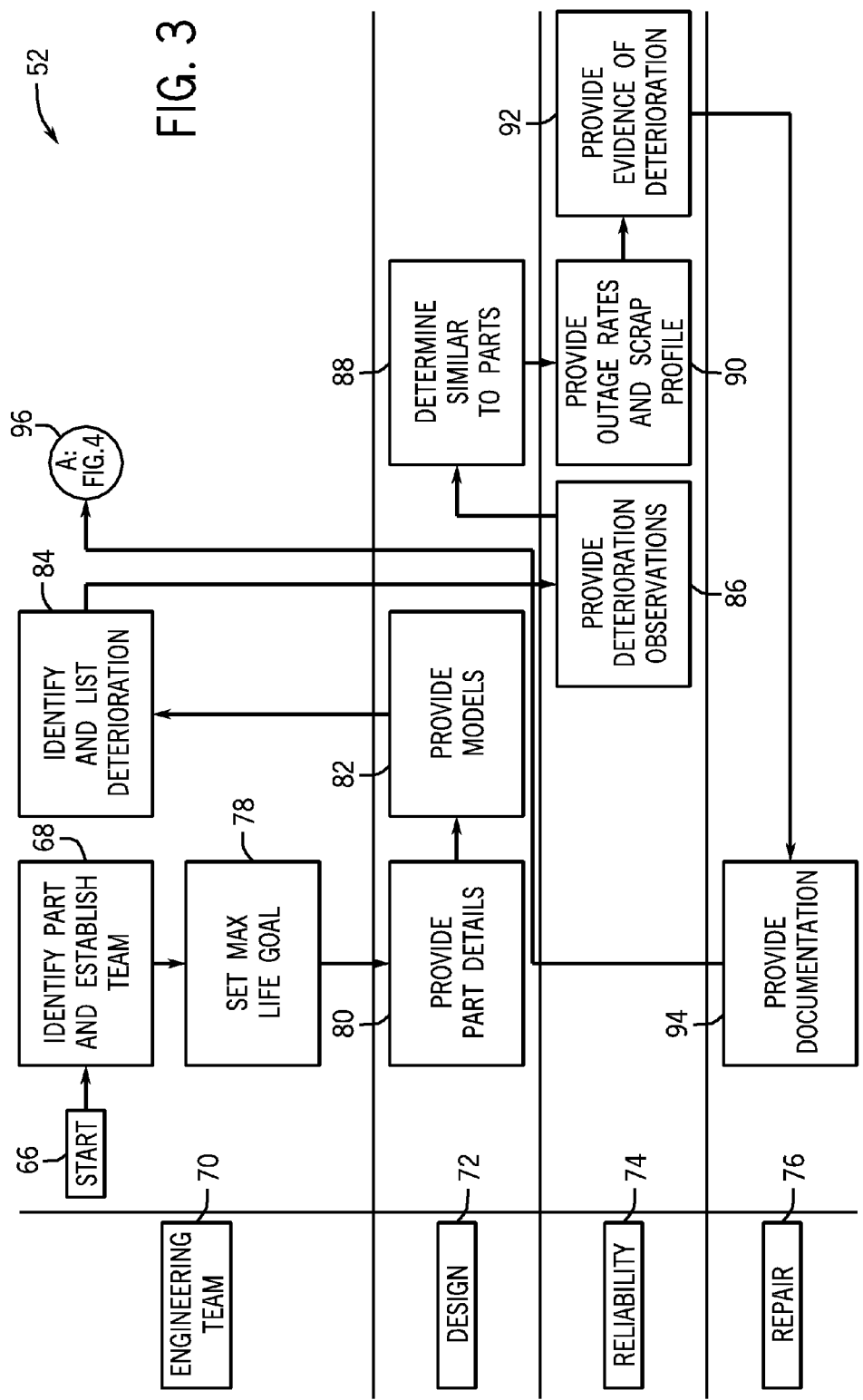
FIGS. 3 and 4 are flowcharts illustrating of an embodiment of a process suitable for approving components for condition based replacement life (CBRL)
Figure 4:
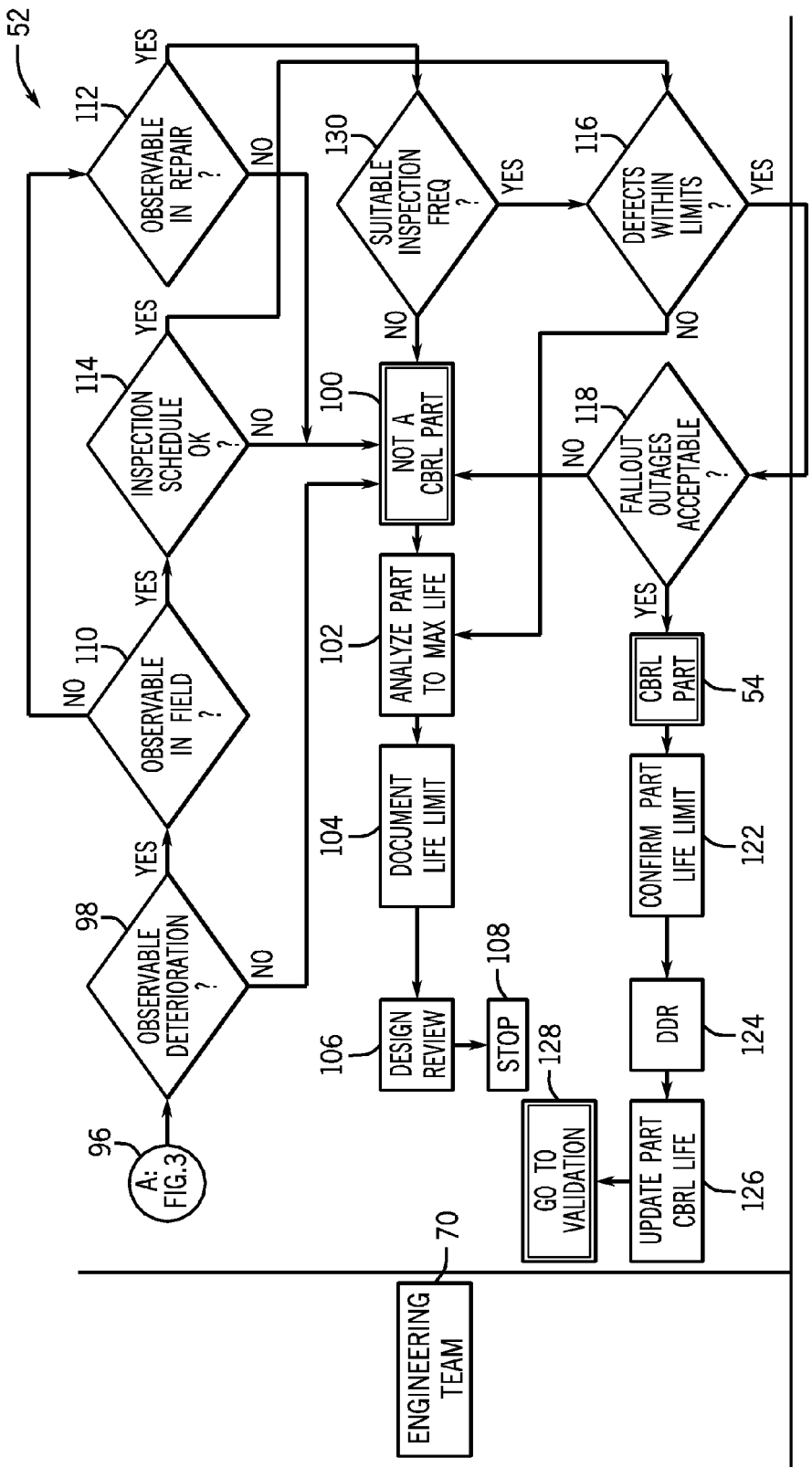

FIGS. 3 and 4 are flowcharts depicting an embodiment of the process 52 that may be used to approve certain turbomachinery 10 components 54 included in the parts list 42. By approving the parts 54, the process 52 may enable the repair of the parts 54 as described above, instead of the replacement of the parts 54. The process 52 may be implemented as executable code instructions stored on a non-transitory tangible computer-readable medium, such as the volatile or non-volatile memory of a computer or a computer system.

In the embodiment depicted in FIG. 3, the process 52 is first initiated at block 66. The process 52 may then identify a part of interest and establish a cross-functional engineering and review team and/or process (block 68). For example, a part of interest may include any turbomachinery 10 component or subsystem, including but not limited to combustor 12 components, turbine 14 components, exhaust 16 components, and/or compressor 20 components. The cross-functional engineering and review team may include an engineering team 70, a design team 72, a reliability team 74, a repair team 76, or a combination thereof. A cross-functional engineering and review process for the teams 70, 72, 74, and/or 76 may be implemented as executable code instructions stored on a non-transitory tangible computer-readable medium, such as the volatile or non-volatile memory of a computer or a computer system.

The process 52 may then target a new maximum part life goal that exceeds the originally estimated replacement life (block 78). For example, a goal such as fired hours, N-ratio, and other life expectancy measures may be derived (block 78) based on the part of interest. The process 52 may then provide part details (block 80). For example, engineering data 44 part details shown in FIG. 2, may be provided (block 80), including part schematics, photographs, free-body diagrams, and/or material used. Models may also be provided (block 82), such as the engineering data 44 physics-based models (e.g., stress/strain models, temperature analysis models, computer aided design [CAD] models, finite element analysis [FEA] models, low cycle fatigue [LCF] life prediction models, computational fluid dynamics [CFD] models, parametric solid models, non-parametric solid modeling, 3-dimension to 2-dimension FEA mapping models), statistics-based models (e.g., Montecarlo simulations, data mining models, linear regression models, non-linear regression models).

The process 52 may then identify and list a part deterioration (block 84), such as part deterioration modes based on the provided models (block 82), including FMEA modes, LFC life prediction deterioration, and so on. Deterioration observations may then be provided (block 86), including photographs, eddy current excitation graphs, ultrasound graphs, and other non-intrusive measurement observations. In some cases, there may not be sufficient deterioration observations (block 86). Accordingly, the process 52 may identify surrogate parts for analysis, where such parts are similar to the part of interest in terms of physical form, function, and/or manufacturing process (block 88). That is, parts similar to the identified part may be used to provide the deterioration observations (block 88).

The process 52 may then provide estimated unplanned outage rates and a scrap profile (block 90) for the part of interest. For example, the engineering data 44 physics and/or statistical models may be used to analyze the part of interest, and based on the analysis, to provide the outage rates and/or scrap profile (block 90). The scrap profile may be used to predict a number of parts that may be scrapped prior to reaching their repairable limit. Evidence of deterioration may then be provided for the part of interest or for similar-to parts (block 92). Such evidence may list deterioration limits (e.g., crack sizes, eddy current flows). The process 52 may then provide documentation (block 94), such as repair process documentation, desired limits and cost profiles for deterioration modes, and the like. The process 52 may then continue (block 96) as described further with respect to FIG. 4.

FIG. 4 is a flowchart depicting a continuation of an embodiment of the process 52 previously described above with respect to FIG. 3. In the depicted embodiment, following the block 96 from FIG. 3, the process 52 may determine if the deterioration of the part of interest is observable (decision 98). For example, some parts may include visual cracks, or deterioration observable by other techniques (e.g., non-destructive inspection techniques), while other parts may not exhibit observable deteriorations. Accordingly, if the deterioration is not observable, then the process 52 may determine (decision 98) that the part is not suitable for CBRL (block 100). Parts not suitable for CBRL (block 100) may then be analyzed (block 102), for example, to determine a maximum life for the part. In one example, the engineering data 44, the contract data 46, the economic data 48, and/or the regulatory data 50, may be used to analyze (block 102) the part's maximum life.

If a life limitation is found prior to the parts maximum life, then the maximum life value may be reduced to a value less than the identified limitation and documented (block 104). A design review (block 106) may then be held, for example, with chief engineering personnel and/or through computer software, related to the part of interest, and the process 52 may then stop (block 108). If the part is determined (decision 98) to have an observable deterioration, the process 52 may then determine (decision 110) if the observable deterioration may be found in a field environment (e.g., in situ location of the system that includes the identified part). For example, it may be determined (decision 110) that the deterioration is observable through field inspection techniques such as visual inspections, remote visual inspection (e.g., robotic inspections), borescope inspections and/or enhanced borescope inspections. If the deterioration is determined (decision 110) to not be observable in the field, then the process 52 may determine (decision 112) if the deterioration is observable in a repair facility.

The repair facility may include observation techniques, including but not limited to dye penetrant inspection, electromagnetic testing (e.g., eddy current inspections, alternating current field measurement, alternating current potential drop measurement, Barkhausen testing, direct current potential drop measurement, magnetic flux leakage, magnetic-particle inspection), ellipsometry, guided wave testing, hardness testing, impulse excitation technique (IET), infrared testing, thermal testing, thermographic inspection, laser testing (e.g., electronic speckle pattern interferometry, low coherence interferometry, profilometry, shearography), leak testing (e.g., absolute pressure leak testing, bubble testing, halogen diode leak testing, hydrogen leak testing, mass spectrometer leak testing, tracer-gas leak testing method), magnetic resonance imaging (MRI), near-infrared spectroscopy, optical microscopy, positive material identification (PMI), radiographic testing (e.g., computed radiography, digital radiography, neutron radiographic testing, x-ray testing), electron microscope testing, ultrasonic testing (e.g., acoustic resonance technology, laser ultrasonic testing, internal rotary inspection system [IRIS] testing, time of flight diffraction ultrasonic [TOFD] testing), heat exchanger life assessment system testing, and so on. If it is determined (decision 112) that the deterioration is not determinable in the repair facility, then the process may label the part as not suitable for CBRL (block 100) and continue as described above.

If the process 52 determines (decision 110) that the deterioration is observable in the field, the process 52 may then determine (decision 114) if a current field inspection schedule (e.g., monthly inspection, six month inspection, yearly inspection, two year inspection) is suitable for detecting the deterioration. If the process 52 determines (decision 114) that the current inspection schedule is unsuitable for detecting the deterioration, the process may then label the part as not suitable for CBRL (block 100) and continue as described above.

If the process 52 determines (decision 114) that the current inspection schedule is suitable for detecting the deterioration and for minimizing or eliminating an unplanned outage, the process 52 may then determine (decision 116), if any defects found may be within approved repairable limits, and may be repaired economically and to regulatory standards. If the process 52 determines (decision 116) that any defects are within approved repairable limits, then the process 52 may determine (decision 118) if a scrap profile (e.g., number of parts that may be deemed as not usable) and/or unplanned outage probability is within acceptable limits. If the process 52 determines (decision 118) that the scrap profile and/or unplanned outage probabilities are not within acceptable limits, then the process 52 may then label the part as not suitable for CBRL (block 100) and continue as described above.

If the process 52 determines (decision 118) that the scrap profile and/or unplanned outage probabilities are within acceptable limits, then the process 52 may then label the part as a CBRL-approved part 54. The process 52 may then confirm and/or establish (block 122) a maximum CBRL life limit for the part of interest. A detailed design review (DDR) may then be held (block 124) with the chief engineering personnel and/or through computer software, suitable for reviewing the current status of the process 52 and to close any open action items. The process 52 may then update the part CBRL life (block 126), for example, in controlled documents or databases that permit commercial application of engineering approved component life extensions, and save the documents related to the process 52. In one embodiment, the documents may be saved in an electronic database. The process 52 may then validate and repair the part of interest (block 128), as described in more detail below with respect to FIG. 5.

If the process 52 determines (decision 112) that the deterioration is observable in the repair facility, the process 52 may then determine (decision 130) whether the repair facility's frequency of inspection is suitable. If the process 52 determines (decision 130) the inspection frequency is suitable, then the process 52 may continue with decision 116 as described above. If the determination (decision 130) is that the frequency is unsuitable, then the process may label the part as not suitable for CBRL (block 100) and also continue as described above.

Figure 5:
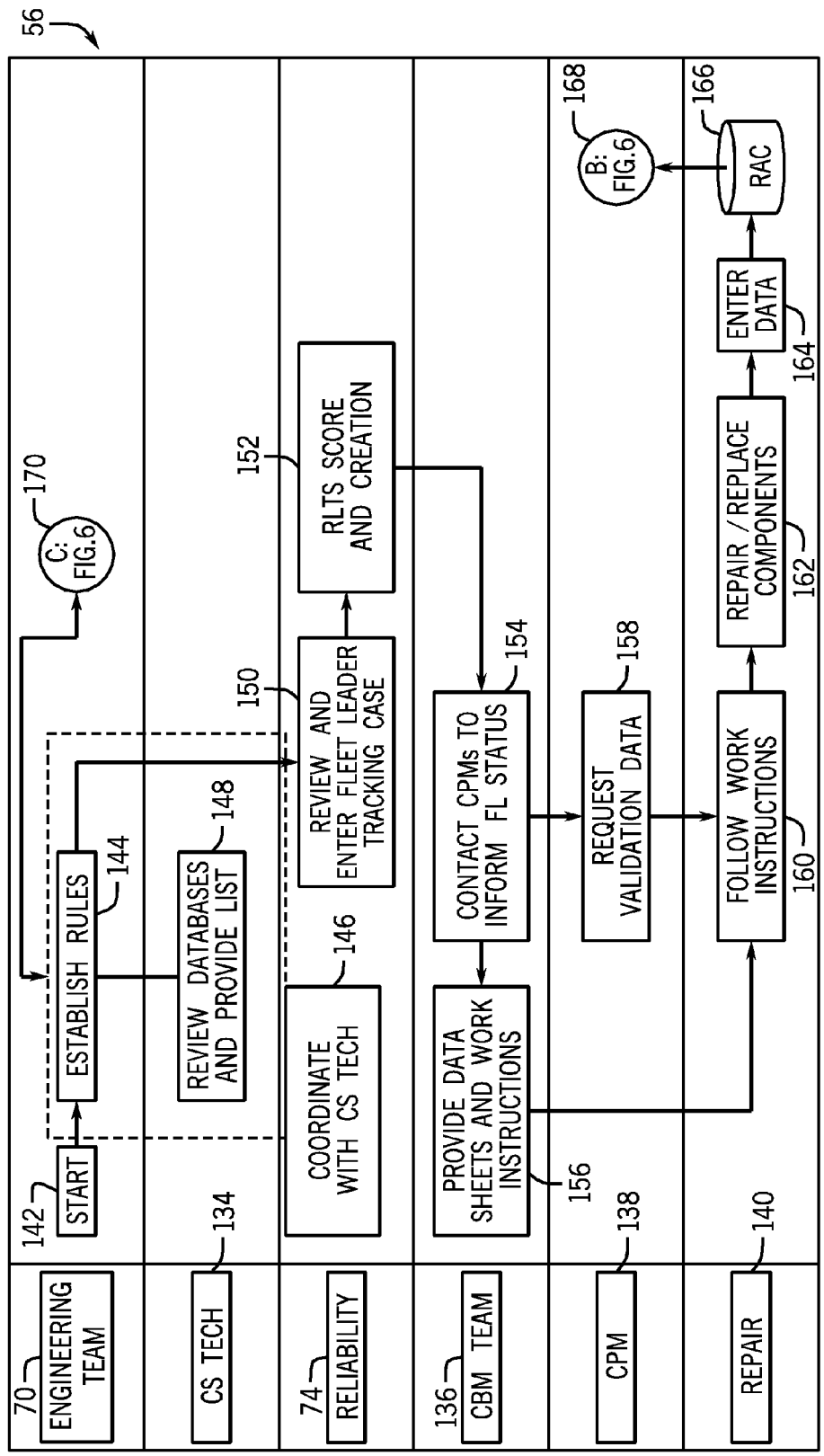
FIGS. 5 and 6 are flowcharts illustrating an embodiment of a process suitable for validating CBRL-approved parts.
Figure 6:
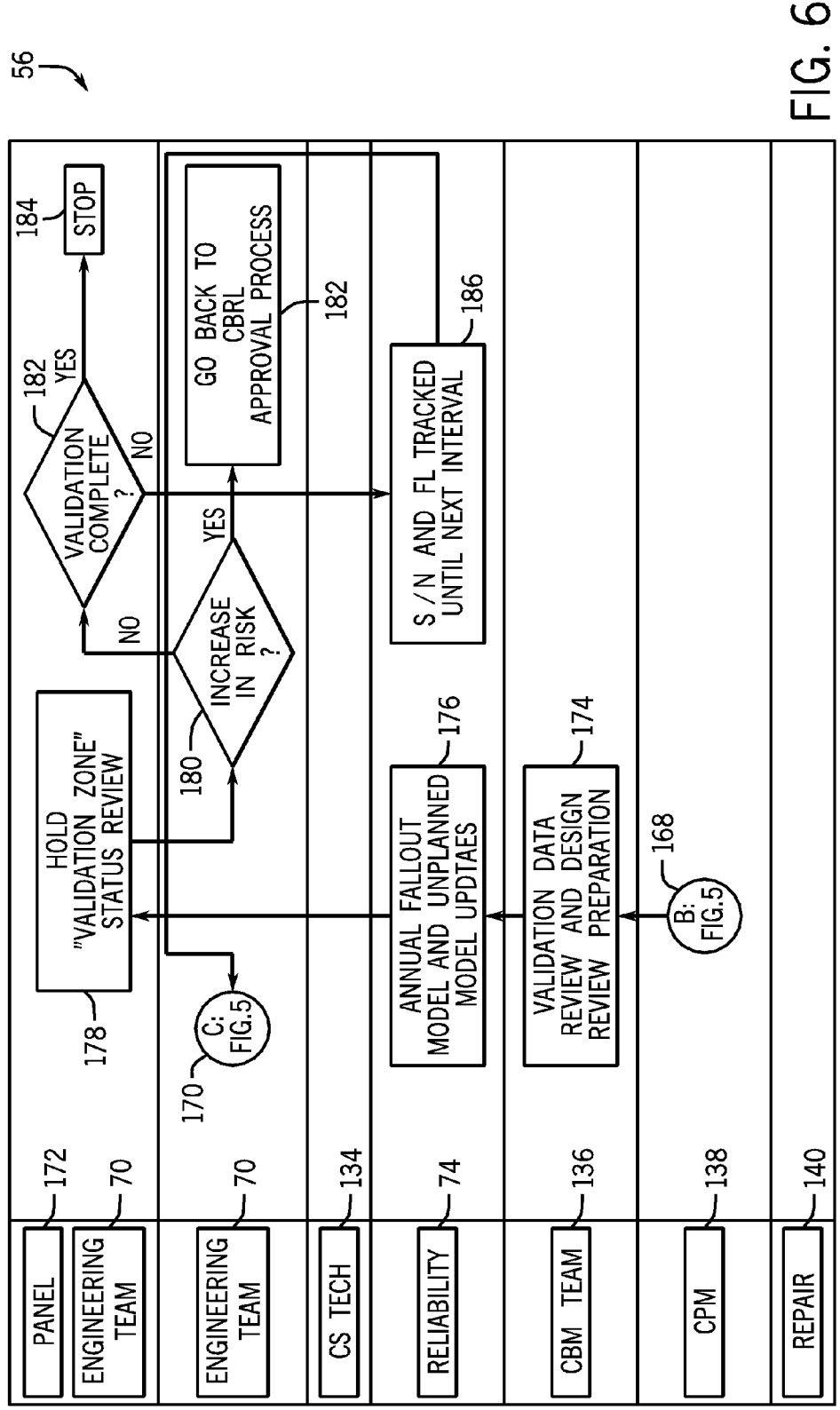

FIGS. 5 and 6 are flowcharts depicting an embodiment of the process 56 useful in validating and repairing CBRL-approved parts 54. By validating the CBRL-approved parts 54, the CBRL approval process 52 may be verified and improved. The process 56 may be implemented as executable code instructions stored on a non-transitory tangible computer-readable medium, such as the volatile or non-volatile memory of a computer or a computer system.

In the embodiment of FIG. 5, the process 56 may include a cross-functional team, such as the engineering team 70, a contractual services (CS) technical team 134, the reliability team 74, a condition based maintenance (CBM) team 136, a contract performance manager (CPM), and a repair team 140. The process 56 may also include software suitable for use by the aforementioned teams, or used in lieu of the aforementioned teams. The process 56 may first be initiated at block 142. The process 56 may then establish a set of rules (block 144) that initiate component tracking, and that coordinate (block 146) with the CS technical team 134 to identify CBRL-approved part 52 numbers for tracking during the verification process 56. For example, the CS technical team 134 may review (block 146) part 52 attributes (e.g., configuration, material type) and provide a list (block 146) of parts suitable for establishing the rules (block 144). The process 56 may then review and enter the part for tracking (block 150), for example, by a fleet leader tracking system (FLTS) suitable for tracking the turbine system 10 fleet-wide.

The process 56 may then create a scorecard (block 152). The scorecard may be used to further analyze the part and to provide a tracking document related to the part's performance. The process 56 may then notify the CPM (block 154) of the fleet leader (FL) status and of the components 52 approved for CBRL, for example, via email or phone. A parts data sheet and work instructions may then be provided (block 156), for example, to the team 140, useful in detailing repair instructions for the approved parts 52. Additionally, the process may provide letter templates so that the CPM 138 may issue a formal validation request (block 158) asking the team 140 to collect a desired set of validation data during inspection and repair of the parts 52. The process 56 may then follow the work instructions (block 160) and collect or more generally, record validation data, during repair activities performed by the team 140.

The process 56 may then repair or replace (block 162) the components 52. Indeed, rather than replace all components 52, the process 56 may now inspect the components 52, and repair (block 162) the components still having a useful operational life. By replacing only the components 52 that are beyond repair limits (block 162) and by repairing all other components 52, the process 56 may enable significant cost reductions and improve operational effectiveness. The process 56 may then enter data (block 164), including photographs, inspection results, repair logs, and so on, into a database 166, such as a customer service case log database 166. The database 166 may be further communicatively coupled to other systems or processes, such as an engineering part inspection program, which may then use the inputted data for other uses. The process 56 may then continue (block 168), as described further with respect to FIG. 6 below. Additionally, the process 56 may continue (block 170) from FIG. 6 below back into FIG. 5, also as described in more detail with respect to FIG. 6 below.

FIG. 6 depicts a continuation of an embodiment of the process 56 previously described above with respect to FIG. 5. In the depicted embodiment, an internal oversight panel 172, such as a panel of controlled-title engineering personnel, may also be included to the cross-functional teams 70, 74, 134, 1136, 138, 140, and 142. Following the block 168, the process 56 may then review gathered validation data, and undergo a design review (DR) preparation (block 174). The model 56 may then update an annual scrap and an unplanned outage model (block 176). For example, a scrap profile based on how many parts fall out of operations or are otherwise found to be undesired for use in operations, may be updated annually (block 176). Likewise, a number of unplanned outages occurring annually may be used to update the unplanned outage model (block 176). Timeframes other than annual times may also be used, such as monthly updates, semi-annual updates, two-year updates, and so on.

The process 56 may then hold a "validation zone" status review (block 178). Various validation zones may be used during the process 56. For example, a validation zone 1 may be created as an interval beginning at approximately 10%, 15%, 20%, 25%, 30%, 35%, 40%, prior to a milestone (e.g., fired hours milestone, usage hours milestone, HGPI, CI, MI) and ending at 10%, 15%, 20%, 25%, 30%, 35%, 40% after the milestone. Likewise a validation zone 2 may be created as beginning at approximately 0%, 10%, 15%, 20%, 25%, 30%, 35%, 40% after the validation zone 1 and ending at approximately 10%, 15%, 20%, 25%, 30%, 35%, 40% after the start of the validation zone 2. Similarly, a validation zone 3 may start at approximately 0%, 10%, 15%, 20%, 25%, 30%, 35%, 40% after the validation zone 2 and end at approximately 10%, 15%, 20%, 25%, 30%, 35%, 40% after the start of the validation zone 3. Likewise, validation zones 4, 5, 6, 7, 8, 9, 10, and upwards may be provided. Dividing operational time into validation zones may enable a more efficient inspection and review of the performance of the approved parts 52.

In one example, an annual validation review may be held by the panel 172 and the engineering team 70, and/or by software instructions, to review the validation data, including any defect trends and emerging defects (e.g., defects not previously identified). The CBRL validation data may be used to substantiate CBRL recommendations (e.g., repair versus replace recommendations). If technical risks are found to be increasing due to the validation data (decision 180), then maximum CBRL life limits may be reassessed and the CBRL approval process 64 may be restarted (block 182). If technical risks are not found to be increasing due to the validation data (decision 180), then the process may determine if the validation is complete (decision 182). For example, the validation may be complete (decision 182) if all of the validation zones (e.g., zone 1, 2, 3, 4, 5, 6, 7, 8) have been validated. If the validation is complete (decision 182), then the validation process may stop (block 184). If the validation process is not complete, then the component's serial number (S/N) and fleet lead (FL) may be tracked until the subsequent validation interval (block 186), and the process may then restart (block 170) at block 144 of FIG. 5, as described above. By validating and repairing the CBRL-approved parts 52, the process 56 may establish that the CBRL repair is operating as desired, and may document performance and defects of the parts 52 as they go through subsequent usage intervals.

Figure 7:
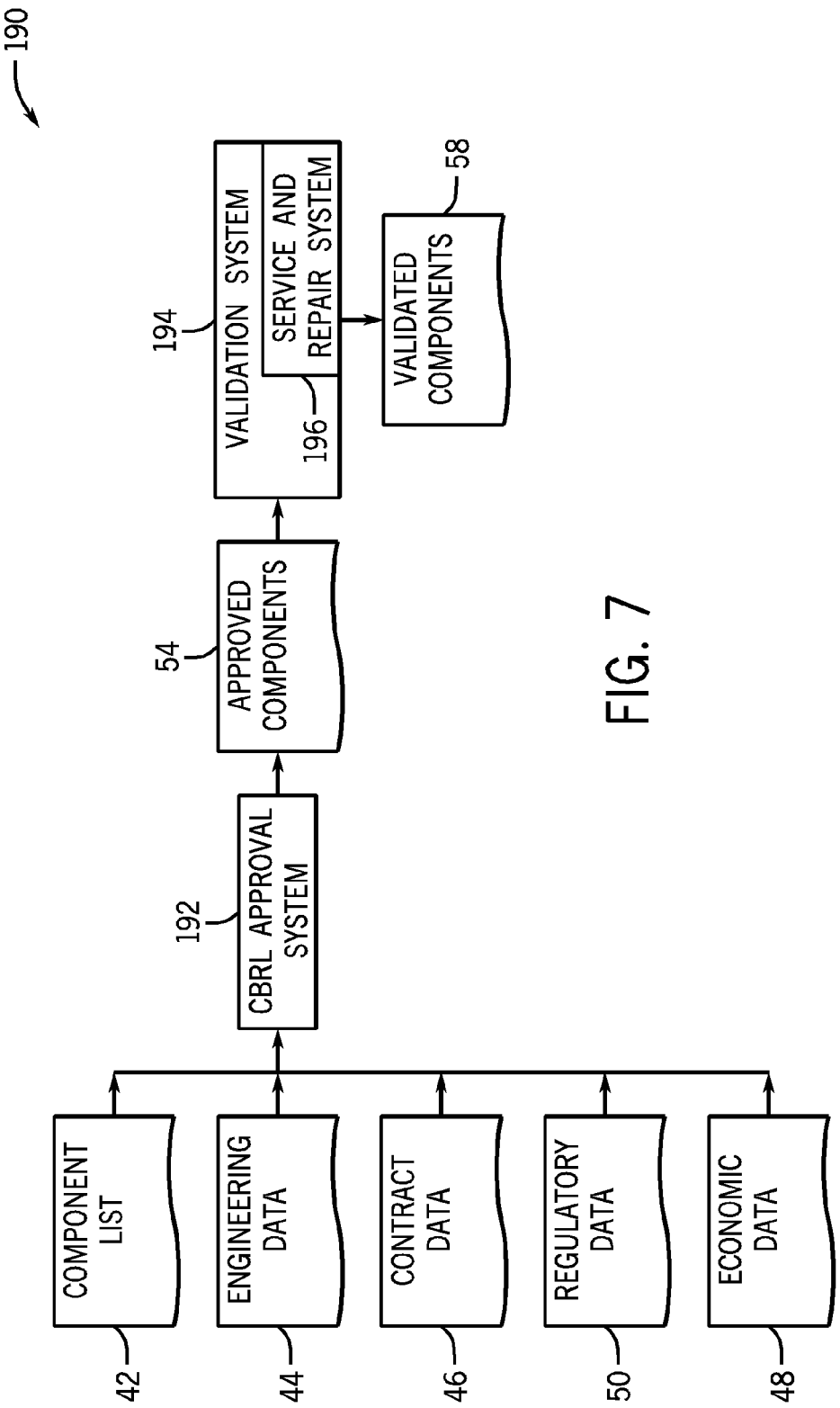
FIG. 7 is a block diagram of an embodiment of a system suitable for implementing the processes of FIGS. 3, 4, 5, and 6.

Turning to FIG. 7, the figure is a block diagram of an embodiment of a system 190 suitable for implementing the techniques described herein. The system 190 may be implemented as executable code instructions stored on a non-transitory tangible computer-readable medium, such as the volatile or non-volatile memory of a computer or a computer system. In the depicted embodiment, the system may use input data, such as the component list 42, the engineering data 44, the contract data 46, the economic data 48, and/or the regulatory data 50 as inputs to a CBRL approval system 192. The CBRL approval 192 may implement the process 64, as described above with respect to FIGS. 3 and 4, to approve certain components of the component list 42, such as the approved components 54. The CBRL-approved components 54 may then be used as inputs into a validation system 194. In the depicted embodiment, the validation system 194 includes a service and repair system 196, such as a service shop suitable for inspecting and repairing the parts 54. The validation system 194 may implement the process 56 to validate and repair the approved components 54, as described above with respect to FIGS. 5 and 6, and output the validated components 58.

Technical effects of the invention include the ability to improve on the operational life of turbomachinery, such as a gas or steam turbine system, a pump, or a compressor. A process and a system are provided that includes technical analysis as well as commercial analysis of risks associated with continuing operations of the turbomachinery and/or extending certain recommended limits (e.g., fired hours, number of starts) reliably and efficiently. Logistic efficiencies may be realized by enabling continued operations and extending limits with current components. In this way, the components may not have to undergo replacement or reconditioning. Further, costs associated with the replacement or reconditioning may be substantially reduced or eliminated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a processor configured to execute:
a condition based replacement life (CBRL) approval system configured to receive a turbomachinery component data from a plurality of sensors; to determine if a component deterioration is observable based on the turbomachinery component data; and if the component deterioration is observable, to approve a turbomachinery component for CBRL use based on the turbomachinery component data;
derive a maximum part life that exceeds a manufacturer originally estimated life for the turbomachinery component based on an analysis of an outage rate, a scrap profile, or a combination thereof, wherein the scrap profile comprises a number of parts for the turbomachinery component that fall out of operations, are found to be undesired for operations, or a combination thereof;
a CBRL validation system configured to validate the turbomachinery component into a validated turbomachinery component by applying a validation analysis based on a plurality of validation zones, wherein each validation zone in the plurality of validation zones comprises a time prior to a fired hours milestone at which the turbomachinery component is inspected to observe the deterioration, wherein the processor is configured to validate, via the CBRL validation system, a validated turbomachinery component to operate in a turbomachinery beyond a service time of the turbomachinery component, wherein a first service time for a first validation zone for the turbomachinery component comprises a manufacturer recommended number of fired hours, a second service time for a second validation zone for the turbomachinery component comprises a hot gas path inspection (HGPI) interval, a third service time for a third validation zone for the turbomachinery component comprises a combustion inspection (CI) interval, and a fourth service time for a fourth validation zone for the turbomachinery component comprises a major inspection (MI) interval, and wherein the validated turbomachinery component improves the operational life of the turbomachinery by operating in the turbomachinery beyond the service time.

2. The system of claim 1, wherein the turbomachinery component data comprises a component list, an engineering data, a contract data, an economic data, a regulatory data, or a combination thereof.

3. The system of claim 2, wherein the engineering data comprises a part schematic, a photograph, a free-body diagram, a list of material used in manufacturing the turbomachinery component, a stress/strain model, a temperature analysis model, a computer aided design (CAD) model, a finite element analysis (FEA) model, a failure modes and effects analysis (FMEA), a low cycle fatigue (LCF) life prediction model, a computational fluid dynamic (CFD) model, a parametric solid model, a non-parametric solid model, a 3-dimension to 2-dimension FEA mapping model, a Montecarlo simulation, a data mining model, a linear regression model, a non-linear regression model, a tolerance data, or a combination thereof.

4. The system of claim 1, wherein CBRL validation system comprises a service and repair shop configured to repair the turbomachinery component.

5. The system of claim 4, wherein the CBRL validation system is configured to create a work instruction for inspection, repair, or a combination thereof, of the turbomachinery component in the service and repair shop, track the turbomachinery component when in use by the turbomachinery, and review the performance of the turbomachinery component.

6. The system of claim 1, wherein the CBRL approval system is configured to determine if the turbomachinery component includes a deterioration observable in a field environment, in a service and repair shop, or in a combination thereof.

7. The system of claim 1, wherein the CBRL approval system is configured to use an engineering team, a design team, a reliability team, a repair team, or a combination thereof, to approve the turbomachinery component.

8. The system of claim 1, wherein the CBRL validation system is configured to use a panel, an engineering team, a contractual services team, a reliability team, a condition based maintenance team, a contract performance manager, a repair team, or a combination thereof, to validate the turbomachinery component.

9. The system of claim 1, wherein the turbomachinery comprises a gas turbine, a steam turbine, a wind turbine, a hydroturbine, a compressor, a pump, or a combination thereof.

10. A method, comprising:
    approving via processor, a turbomachinery component for use in a condition based replacement life (CBRL) activity, wherein the approving the turbomachinery component comprises:
        determining if a first deterioration of the turbomachinery component is observable in a field environment via a plurality of sensors;
        determining if a second deterioration of the turbomachinery component is observable in a service and repair shop;
        approving the turbomachinery component based at least in part on the determining the if the first and the second deteriorations are observable;
        deriving a maximum part life that exceeds a manufacturer originally estimated life for the turbomachinery component based on an analysis of and outage rate, a scrap profile, or a combination thereof, wherein the scrap profile comprises a number of parts for the turbomachinery component that fall out of operations, are found to be undesired for operations, or a combination thereof; and
    validating the turbomachinery component after the approving the turbomachinery component for use in the CBRL activity, wherein the validating the turbomachinery component comprises:
        inspecting the turbomachinery component, repairing the turbomachinery component, or a combination thereof;
        tracking a usage of the turbomachinery component in a turbomachinery after the inspecting, the repairing, of the combination thereof;
        evaluating a performance of the turbomachinery component in the turbomachinery, wherein the evaluating the performance of the approved turbomachinery component in the turbomachinery comprises creating a plurality of validation zones each validation zone comprising a time prior to a fired hours at which a status review of defect trends is performed on a fleet of turbomachinery having the turbomachinery component, wherein the CBRL activity comprises using the turbomachinery component as a validated turbomachinery component in the turbomachinery beyond a service time of the turbomachinery component, wherein a first service time for a first validation zone for the turbomachinery component comprises a manufacturer recommended number of fired hours, a second service time for a second validation zone for the turbomachinery component comprises a hot gas path inspection (HGPI) interval, a third service time for a third validation zone for the turbomachinery component comprises a combustion inspection (CI) interval, and a fourth service time for a fourth validation zone for the turbomachinery component comprises a major inspection (MI) interval, and wherein the validated turbomachinery component improves the operational life of the turbomachinery by operating in the turbomachinery beyond the service time.

11. The method of claim 10, wherein approving the turbomachinery component based at least in part on the determining if the first and the second deteriorations are observable comprises:
    if the first deterioration is observable, then determining if a field inspection schedule is suitable;
    if the field inspection schedule is not suitable, then determining that the turbomachinery component is not approved for the CBRL activity;
    if the field inspection schedule is suitable, then determining if the deterioration is within an acceptable limit;
    if the deterioration is not within the acceptable limit, then determining that the turbomachinery component is not approved for the CBRL activity; and
    if the deterioration is within the acceptable limit, then determining that the turbomachinery component is approved for the CBRL activity.

12. The method of claim 10, wherein the determining if the first deterioration of the turbomachinery component is observable in the field environment comprises performing a borescope inspection of the turbomachinery, performing an enhanced borescope inspection of the turbomachinery, performing a visual inspection of the turbomachinery, performing a remote visual inspection of the turbomachinery, or a combination thereof.

13. The method of claim 10, wherein the determining if the second deterioration of the turbomachinery component is observable in the service and repair shop comprises performing a dye penetrant inspection, an electromagnetic testing, an ellipsometry, a guided wave testing, a hardness testing, an impulse excitation technique (JET), an infrared testing, a thermal testing, a thermographic inspection, a laser testing, a leak testing, a magnetic resonance imaging (MRI), a near-infrared spectroscopy, an optical microscopy, a positive material identification (PMI), a radiographic testing, an electron microscope testing, an ultrasonic testing, a heat exchanger life assessment system testing, or a combination thereof.

14. The method of claim 10, wherein the evaluating the performance of the approved turbomachinery component in the turbomachinery comprises creating a second validation zone based on the milestone, and holding the status review of defect trends occurring during the first validation zone, the second validation zone, or combination thereof, to evaluate the performance of the turbomachinery component in the turbomachinery.

15. A system, comprising:
a processor configured to execute:
an approval system configured to approve a turbomachinery component for use in a turbomachinery beyond a service time of the turbomachinery component, and to determine if a first deterioration of the turbomachinery component is observable via a plurality of sensors;
derive a maximum part life that exceeds a manufacturer originally estimated life for the turbomachinery component based on an analysis of an outage rate, a scrap profile, or a combination thereof, wherein the scrap profile comprises a number of parts for the turbomachinery component that fall out of operations, are found to be undesired for operations, or a combination thereof; and
a validation system configured to inspect the turbomachinery component, to repair the turbomachinery component, or a combination thereof; to apply a validation analysis of the turbomachinery component based on a plurality of validation zones to derive a validated turbomachinery component, wherein each validation zone in the plurality of validation zones comprises a time prior to a fired hours milestone at which the turbomachinery component is inspected to observe the deterioration and to use the turbomachinery component in a turbomachinery after the inspection, the repair, or the combination thereof, of the turbomachinery component, wherein a first service time for a first validation zone for the turbomachinery component comprises a manufacturer recommended number of fired hours, a second service time for a second validation zone for the turbomachinery component comprises a hot gas path inspection (HGPI) interval, a third service time for a third validation zone for the turbomachinery component comprises a combustion inspection (CI) interval, and a fourth service time for a fourth validation zone for the turbomachinery component comprises a major inspection (MI) interval, and wherein the validated turbomachinery component improves the operational life of the turbomachinery by operating in the turbomachinery beyond the service time.

16. The system of claim 15, wherein the validation system is configured to analyze a performance of the turbomachinery component after the use of the turbomachinery component in the turbomachinery.

17. The system of claim 16, wherein the analyze the performance of the turbomachinery comprises determining a defect trend, an emerging defect, or a combination thereof.

* * * * *